Oct. 17, 1967
A. ROTHMAN
3,347,296
BAGEL SLICER
Filed Aug. 27, 1965
3 Sheets-Sheet 1
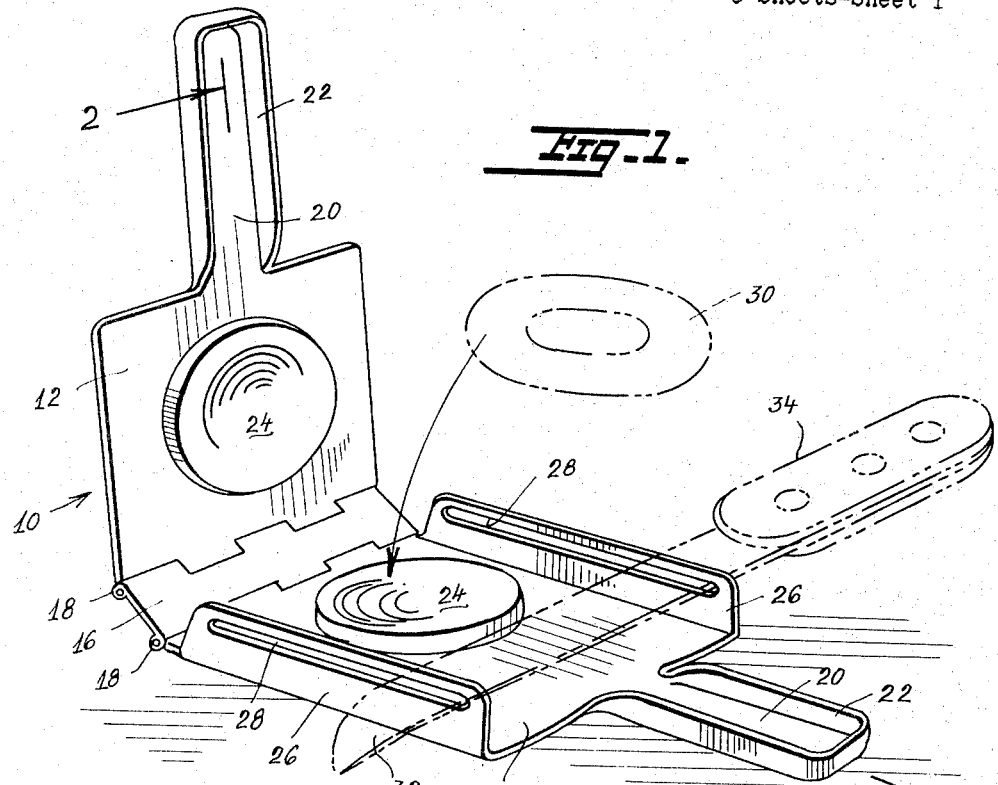
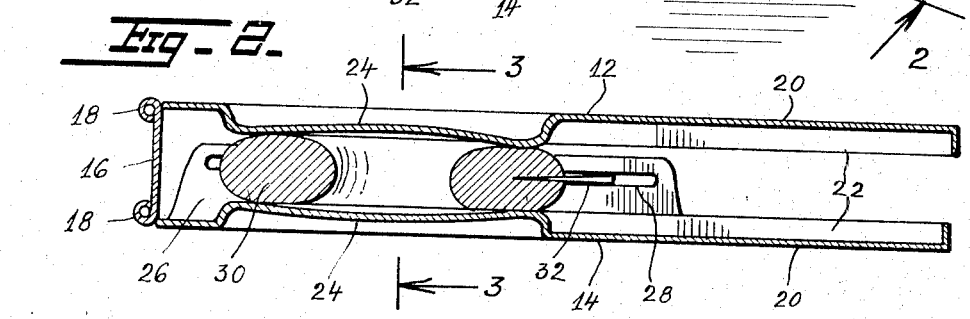
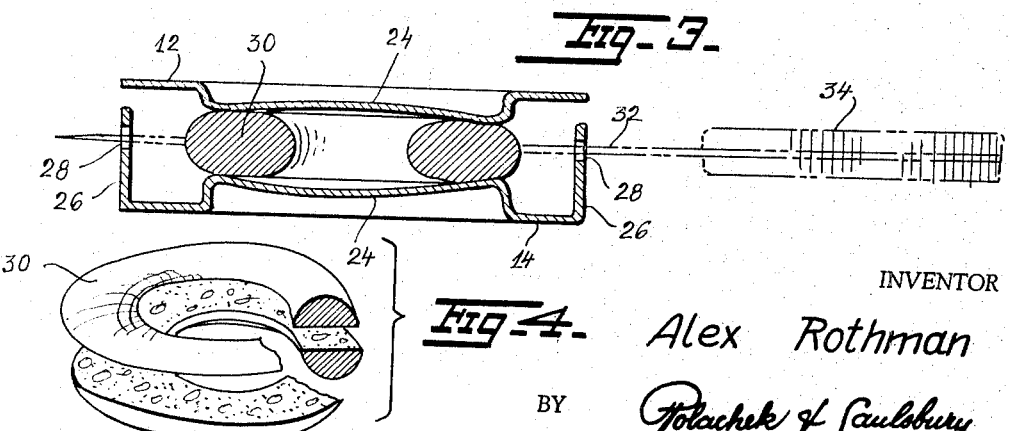
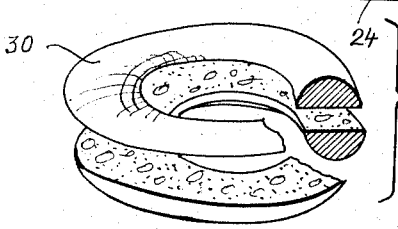
INVENTOR
Alex Rothman
BY Polachek & Saulsbury
ATTORNEYS Oct. 17, 1967   A. ROTHMAN   3,347,296
BAGEL SLICER
Filed Aug. 27, 1965   3 Sheets-Sheet 2
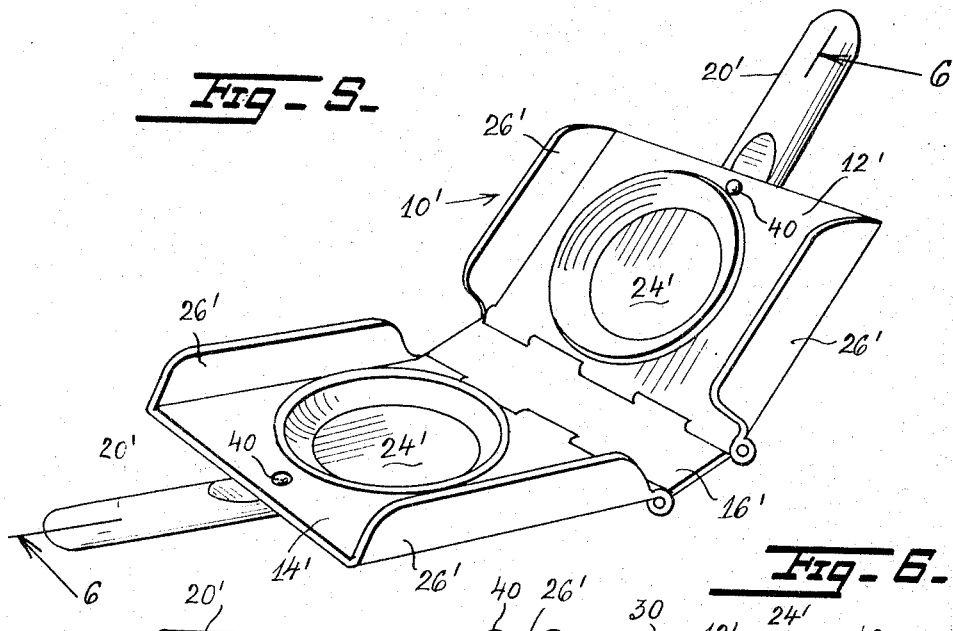
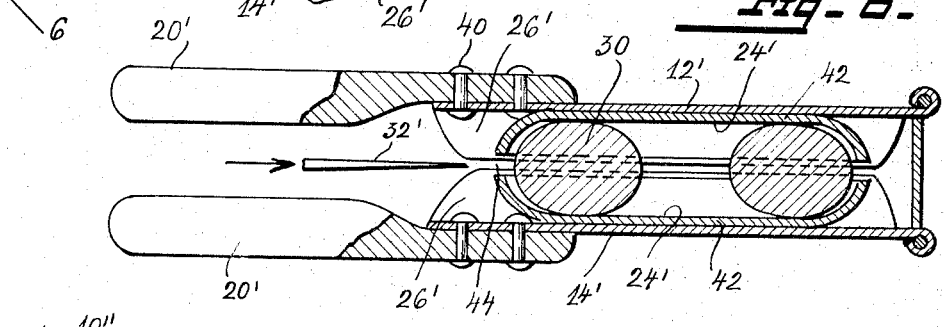
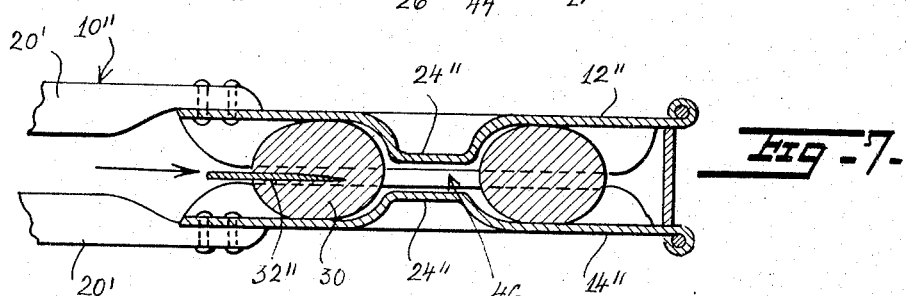
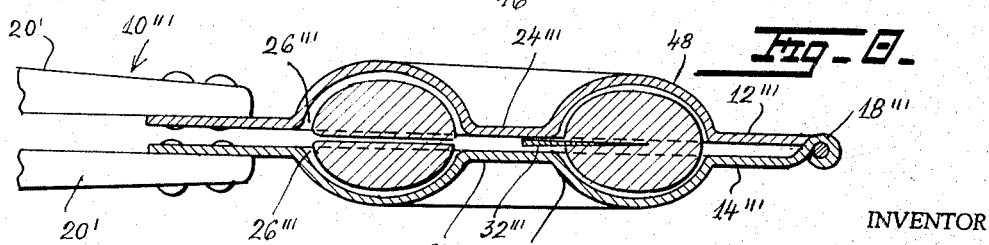
INVENTOR
Alex Rothman
BY
Polachek & Saulsbury
ATTORNEYS

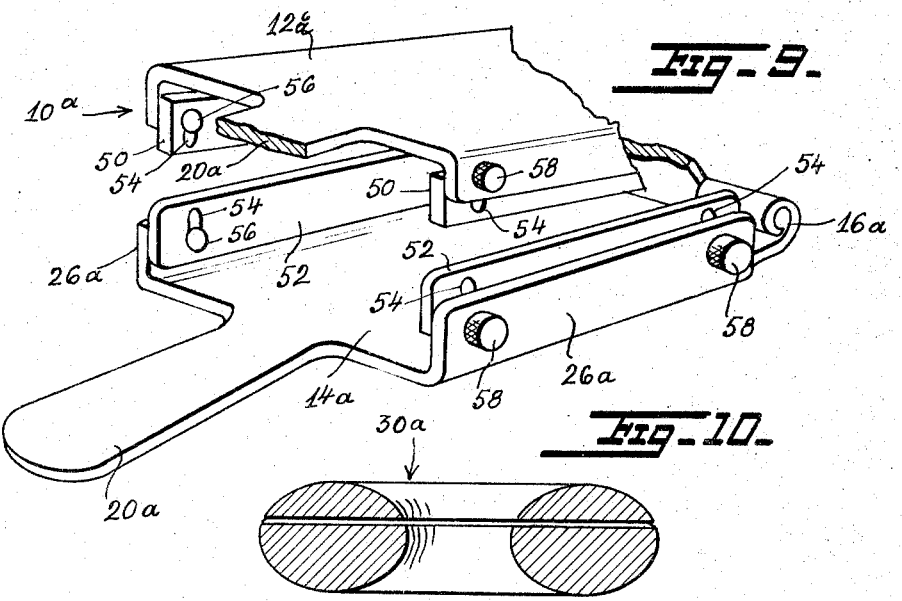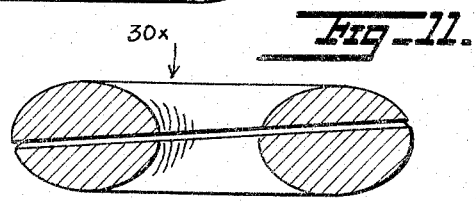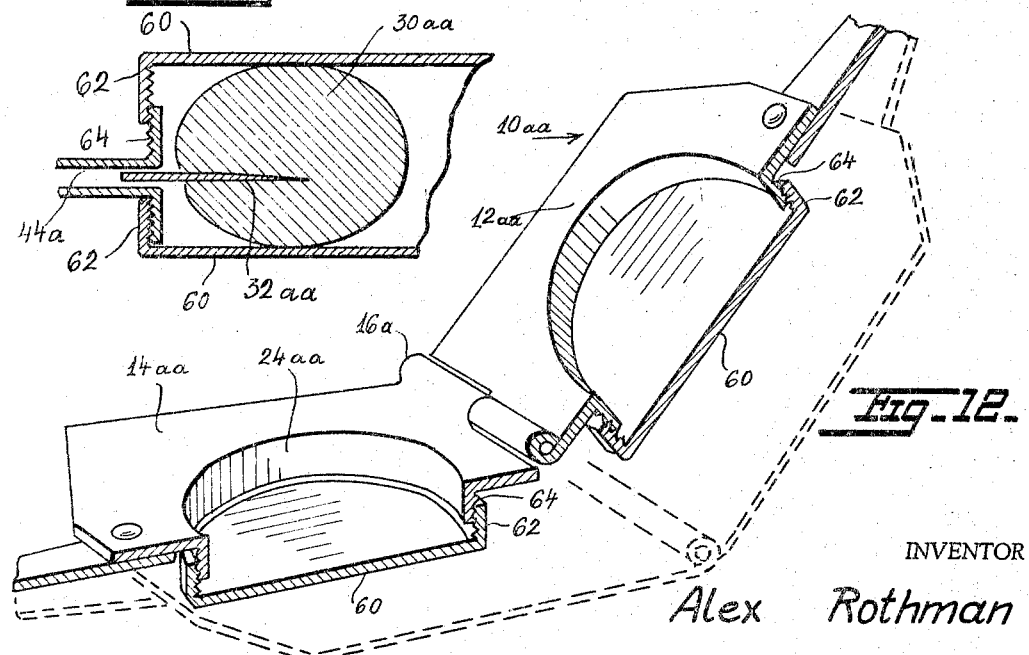

United States Patent Office 3,347,296
Patented Oct. 17, 1967

3,347,296
BAGEL SLICER
Alex Rothman, 217 E. Mount Eden Ave.,
New York, N.Y. 10457
Filed Aug. 27, 1965, Ser. No. 483,246
9 Claims. (Cl. 146—216)

ABSTRACT OF THE DISCLOSURE

Apparatus for supporting bagels in position for slicing into two slices having means for holding the bagel in position preventing sliding thereof and for guiding the cutting knife. The apparatus includes a pair of rectangular plates placed end to end and hinged to each other and being provided with projecting handles, with slots in the sides of the plates for guiding the cutting knife.

---

This invention relates specifically to new and useful improvements in apparatus for slicing bagels into two slices.

A bagel is usually circular in formation with a hole in the center providing a ring-like hard body which is relatively thin and is ordinarily served by first slicing it. Because of the hardness of the bagel crust and the comparative narrowness of the bagel, it is difficult to slice the bagel by hand without injury to the hand.

It is therefore a principal object of the present invention to provide apparatus for cutting a bagel which not only holds the bagel in position but also provides means for guiding the cutting knife.

Another important object of the invention is to provide apparatus of this kind that prevents sliding movement of the bagel so that the bagel can be sliced across its midsection in accordance with the manner in which it is usually held and sliced by hand.

Another object of the invention is to provide apparatus for supporting a conventional bagel in such fashion as to permit of its severance into two uncompressed and unbroken slices, each having a thickness one-half that of the original bagel.

Another object of the invention is to provide apparatus for means to flatten the bagel so that it will easily fit into a toaster.

Still another object of the invention is to provide apparatus for facilitating the splitting of conventional bagels into identical slices by means of a conventional bread knife.

It is also an object of the invention to provide apparatus of this type which is safe to use, inexpensive to manufacture, sanitary, free from tendency to wear and rugged enough to withstand the abuse to which culinary apparatus is notoriously subject.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of apparatus for slicing a bagel embodying the invention in open inoperative position, a cutting knife being shown in operative position, a bagel being shown in dotted lines preparatory to positioning in the apparatus.

FIG. 2 is a sectional view taken on the line 2—2 of FIG. 1 showing the apparatus closed and a bagel in position to be sliced, a cutting knife being shown in operative cutting position.

FIG. 3 is a vertical sectional view taken on the line 3—3 of FIG. 2.

FIG. 4 is a top perspective view of a bagel sliced by the apparatus of FIG. 1, parts being shown broken away, parts being shown in section.

FIG. 5 is a view similar to FIG. 1 of apparatus for slicing a bagel embodying a first modified form of the invention.

FIG. 6 is a horizontal sectional view taken on the line 6—6 of FIG. 5, parts being shown broken away.

FIGS. 7 and 8 are views similar to FIG. 6 of apparatus embodying second and third modified forms of the invention.

FIG. 9 is a perspective view of apparatus for slicing bagels embodying yet another fourth modified form of the invention, parts being shown broken away, the apparatus being shown in partly closed operative position.

FIG. 10 is a sectional view through the center of a bagel sliced by the apparatus of FIG. 9.

FIG. 11 is a similar view of another bagel sliced by the apparatus of FIG. 9.

FIG. 12 is a fragmentary part perspective and part diagrammatic view of bagel slicing apparatus embodying yet another fifth modified form of the invention.

FIG. 13 is a view similar to FIG. 6 showing a bagel in operative position in the apparatus of FIG. 12, the cutting knife partly penetrating the bagel.

Referring in detail to the various views of the drawings, in FIG. 1 apparatus for slicing a bagel is shown and designated generally at 10. The apparatus 10 consists of two metal plates 12 and 14, rectangular in shape placed end to end and hinged to each other along adjacent ends by a hinge plate 16, with interconnecting knuckles 18.

An elongated flat handle 20 extends integrally from the center of each opposite end of each plate with a continuous inwardly extending flange 22 extending around the sides and free end thereof. In the center of each plate, there is a circular depression 24, the depressions extending in opposed relation toward each other as best seen in FIG. 2. The base of each depression is slightly curved outwardly as viewed in FIG. 2 thereby bringing the peripheral edges of the bases closer to each other than the remainder of the bases when the apparatus is in closed operative position as shown in FIGS. 2 and 3.

In accordance with the invention, plate 14 is formed with inwardly extending flanges 26, 26 along its opposed sides and each flange is formed with an elongated closed slot 28 adjacent the outer edge thereof. The flanges 26 are slightly narrower than the width of the hinge plate 16 as seen in FIG. 2.

In operation, a bagel 30 is placed on the depression 24 on plate 14, the hinge plate 16 swung to upright position and the plate 12 then swung downwardly into overlapping relation with the peripheral edge of the base and adjacent area of the depression 24 thereon contacting the top surface of the bagel, and the handles 20 disposed in overlapping relation. The handles are squeezed together by the hands of the operator thereby clamping the bagel between the peripheral and adjacent areas of the depressions, against accidental displacement.

The elongated blade 32 of a knife 34 is inserted through one end of the aligned slots 28, the outer end as viewed in FIG. 1, whereby the blade is positioned between the depressions 24 in position to contact the peripheral edge of the bagel as seen in FIG. 3. When the blade is in this position, cutting movements thereof are guided by the edges of the slot 28 until the bagel is completely sliced into two slices as seen in FIG. 4.

In FIGS. 5 and 6, apparatus for slicing a bagel embodying a modified form of the invention is shown and designated generally at 10'. The apparatus 10' comprises a pair of plates 12' and 14' joined at adjacent ends by a hinge plate 16'. The plates are formed with elongated wooden handles 20', 20' generally oval in cross-section, secured to the plates by rivets 40. Instead of depressions such as depressions 24 of the apparatus 10, the plates are provided with shallow pans 24', opening outwardly and spot welded to the plates as indicated at 42. Both plates 12' and 14' are provided with inwardly extending flanges 26' along the sides thereof, which flanges are in opposed relation with a slight clearance 44 therebetween when the plates are in closed operative position as shown in FIG. 6.

When the parts are in operative position as shown in FIG. 6, a knife blade 32' may be inserted through the handles 20', 20' and into the clearance 44 between the opposed edges of the flanges 26', and cutting movement of the blade will be guided by the opposed edges of the flanges, thereby guiding the blade to cutting the bagel 30 into two slices.

In FIG. 7, a second modified form of apparatus for slicing bagels is shown and designated 10". The apparatus 10" differs from the apparatus 10' of FIG. 5 merely in that in place of the pans 24' the plates 12" and 14" are formed with depressions 24" similar to the depressions 24 of FIG. 1 but smaller in diameter so as to fit in the central hole 46 in the bagel 30 when seated on the plate 14". The depressions 24" hold the bagel against accidental displacement while the knife blade 32" is cutting therethrough.

A third modified form of apparatus for slicing bagels is shown in FIG. 8 and designated generally at 10'''. The apparatus 10''' differs from the apparatus 10" of FIG. 7 in that the plates 12''' and 14'''' are curved as indicated at 48 around the depressions 24''' bringing the flat portions thereof in close proximity to each other, which flat portions at the inner ends are formed into interconnecting knuckles 18'''. In the cutting movements, the blade 32''' is guided by the flanges 26''' on the plates as in the apparatus 10".

Referring now to FIG. 9, herein is shown a fourth modified form of apparatus for slicing bagels designated generally at 10a. The apparatus 10a is adjustable for cutting the bagel in two slices across the center thereof as shown in FIG. 4 or above the center as shown in the bagel 30a in FIG. 10 or at an angle to the horizontal as shown by the bagel 30x in FIG. 11.

The apparatus 10a comprises two rectangular plates 12a and 14a hinged to each other at one end by a hinge connection 16a. Elongated flat handles 20a are formed on the other ends of the plates centrally thereof, and opposed flanges 26a are formed on the plates on the sides thereof. Narrow rectangular shaped plates 50 and 52 are slidably mounted on the flanges 26a of plates 12a and 14, respectively, on the inner surfaces thereof, serving as adjustable extensions. The slidable mounting consists of elongated slots 54 at the ends of the plates 50 and 52 receiving studs 56 carried by the flanges 26a on plates 12a and 14a and provided with knurled outer projecting ends 58. The knife blade is adapted to be guided by the inner opposed edges of the sliding plates 50 and 52 when the plates 12a and 14a are in closed operative, position as shown. When the plates 50 and 52 are adjusted to uppermost position relative to the flanges 26a, when the plates 12a and 14a are in closed operative position, a bagel placed between the plates 12a and 14a is cut above the center thereof, such as the bagel 30a of FIG. 10.

If the plates 50 and 52 are adjusted so that one end, the outer end, is disposed below the center of the bagel, and the other inner end is disposed above the center of the bagel, the bagel will be sliced at an angle to the horizontal center thereof, such as shown in the sliced bagel 30x of FIG. 11.

A fragment of apparatus for slicing bagels embodying a fifth modified form of the invention is shown in FIGS. 12 and 13 and designated generally at 10aa. The apparatus 10aa differs from the apparatus 10a of FIG. 9 in the means for adjusting the position of the slice in the bagel. In place of the adjustable sliding plates 50 and 52 of apparatus 10a, the plates 12aa and 14aa are formed with central depressions 24aa with adjustable circular bases 60 provided with inwardly extending peripheral flanges 62 internally screw threaded to coact with external screw threads 64 on the circular flanges of the depressions 24aa. The bases may be moved inwardly or outwardly of the plates in order to change the position of the clearance 44aa relative to the positioned bagel 30aa to receive the blade 32aa of the knife so as to slice the bagel 30aa at the center thereof or to one side of the center, as shown in FIG. 13.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsection, means on the opposite side edges of the plate for guiding a manually reciprocating knife blade across a clamped bagel between the plates, the means for supporting and clamping a bagel in operative position including opposed depressed portions on both plates centrally thereof, the peripheral edges of the bases thereof being closer to each other than the remainder of the bases when the plates are in closed operative position.

2. Apparatus for supporting bagels in position for slicing into two slices by a reciprocating knife as defined in claim 1 wherein the means for guiding the knife includes upstanding flanges on the side edges of one of the plates, said flanges having elongated slots along the outer free edges thereof to receive the blade of a knife for cutting through a bagel supported between the plates, the edges of said slots guiding the cutting movements of the blade.

3. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsection, means on the opposite side edges of the plate for guiding a manually reciprocating knife blade across a clamped bagel between the plates, the means for supporting and clamping a bagel in operative position including opposed depressed portions on both plates centrally thereof, the peripheral edges of the bases thereof being closer to each other than the remainder of the bases when the plates are in closed operative position, the means for guiding the knife including upstanding flanges on the side edges of one of the plates, said flanges having elongated slots along the outer free edges thereof to receive the blade of a knife for cutting through a bagel supported between the plates, the edges of said slots guiding the cutting movements of the blade.

4. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsection, means on the opposite side edges of the plate for guiding a manually reciprocating knife blade across a clamped bagel between the plates, the hinge consisting of a hinge plate interposed between adjacent ends of the plate and interconnecting knuckles on the adjacent ends of the plates and on the edges of the hinge plate.

5. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsection, means on the opposite side edges of the plate for guiding a manually reciprocating knife blade across a clamped bagel between the plates, and flanges on the free edges of the handles for reinforcing said handles, said hinge consisting of a hinge plate interposed between adjacent ends of the plate and interconnecting knuckles on the adjacent ends of the plate and on the edges of the hinge plate.

6. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsection, means on the opposite side edges of the plate for guiding a manually reciprocating knife blade across a clamped bagel between the plates, the means for supporting and clamping a bagel in operative position including opposed depressed portions on both plates centrally thereof, the peripheral edge of the bases thereof being closer to each other than the remainder of the bases when the plates are in closed operative position, and flanges on the free edges of the handles for reinforcing said handles, said hinge consisting of a hinge plate interposed between adjacent ends of the plate and interconnecting knuckles on the adjacent ends of the plate and along the edges of the hinge plate.

7. Apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed means on the plates for clamping a bagel to be sliced between the plates, means for supporting and clamping a bagel in operative position for slicing through its midsecton, means on the opposite side edges of the plate for guiding a manually reciprocating knife blade across a clamped bagel between the plates, the means for supporting and clamping a bagel in operative position including opposed depressed portions on both plates centrally thereof, the peripheral edges of the bases thereof being closer to each other than the remainder of the bases when the plates are in closed operative position, the on the side edges of the plates, said flanges having elongated slots along the outer free edges thereof to receive means for guiding the knife including upstanding flanges the blade of a knife for cutting through a bagel supported between the plates, the edges of said slots guiding the cutting movements of the blade, and flanges on the free edges of the handles for reinforcing said handles, said hinge consisting of a hinge plate interposed between adjacent ends of the plate and interconnecting knuckles on the adjacent ends of the plate and on the edges of the hinge plate.

8. Adjustable apparatus for supporting bagels in position for slicing into two slices by a reciprocating knife, said apparatus comprising a pair of rectangular shaped plates placed end to end and hinged to each other at the adjacent ends, projecting handles on the plates at the opposite ends thereof, opposed flanges along the side edges of said plates, slidable elongated extensions on said flanges, means of slidable connection between the flanges and extensions, said means including elongated transverse slots at the ends of the extensions and lugs carried by the flanges and projecting into said slots, said extensions adapted to be moved bodily transversely of the flanges and adapted to be tilted relatively to the flanges whereby a bagel supported between the plates is adapted to be sliced in two along various horizontal planes as desired.

9. Adjustable apparatus for supporting bagels in position for slicing into two slices by a reciprocating knife, said apparatus comprising a pair of rectangular shaped plates placed end to end and hinged to each other at the adjacent ends, projecting handles on the plates at the opposite ends theerof, said plates having opposed circular depressions at the center thereof, said depressions having movable and adjustable bases threaded onto a depending fixed portion of the depressions, and means for guiding a reciprocating knife between the plates, said adjustable bases adapted to be toward and away from each other to adjust the position of the knife blade relative to a bagel supported between the depressions.

References Cited
UNITED STATES PATENTS

| | | | |
|---|---|---|---|
| 1,098,941 | 6/1914 | Collins | 146—72 |
| 2,206,154 | 7/1940 | Bixler | 146—72 X |
| 2,206,207 | 7/1940 | Taylor et al. | 146—150 |
| 2,172,538 | 9/1939 | Katzinger | 146—150 |
| 2,918,099 | 12/1959 | Goldstein | 146—150 |

JAMES M. MEISTER, *Primary Examiner.*